L. HANSEN.
MOLDING MACHINE.
APPLICATION FILED FEB. 18, 1918.
1,306,538.
Patented June 10, 1919.
3 SHEETS—SHEET 1.
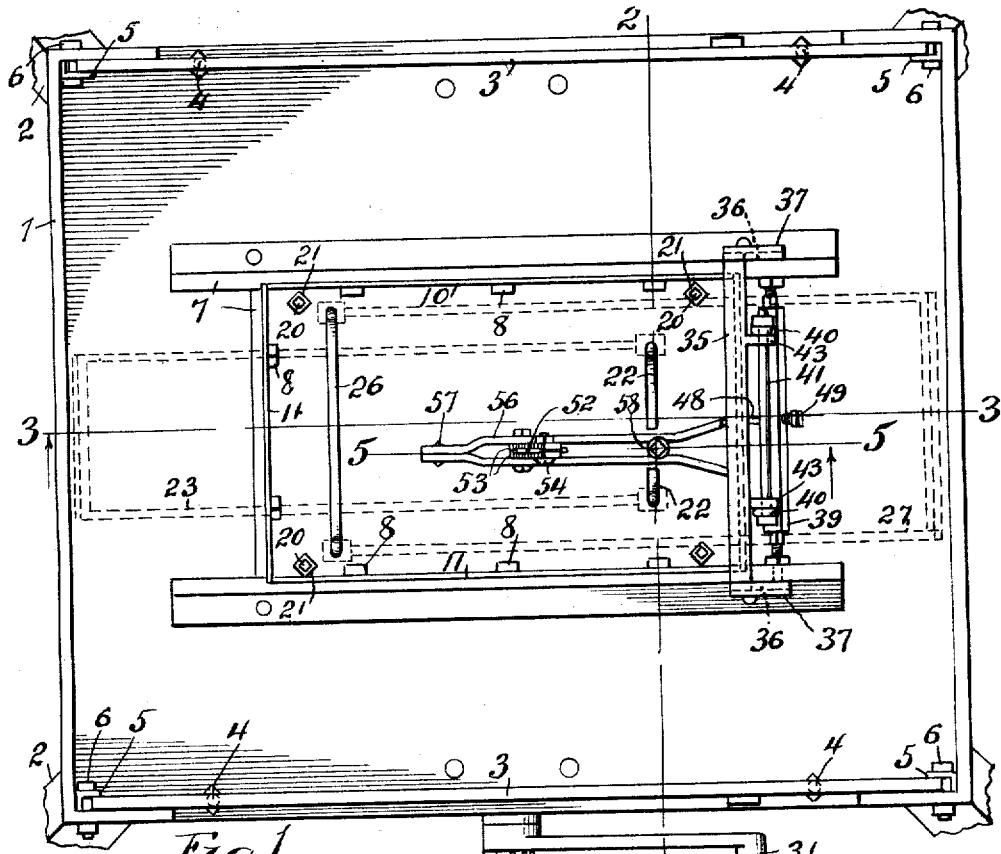
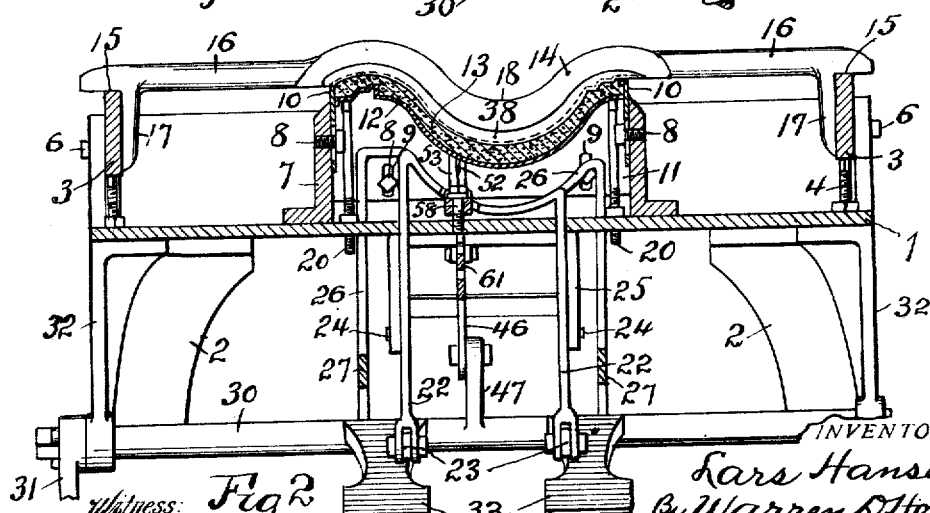

L. HANSEN.
MOLDING MACHINE.
APPLICATION FILED FEB. 18, 1918.
1,306,538.
Patented June 10, 1919.
3 SHEETS—SHEET 2.
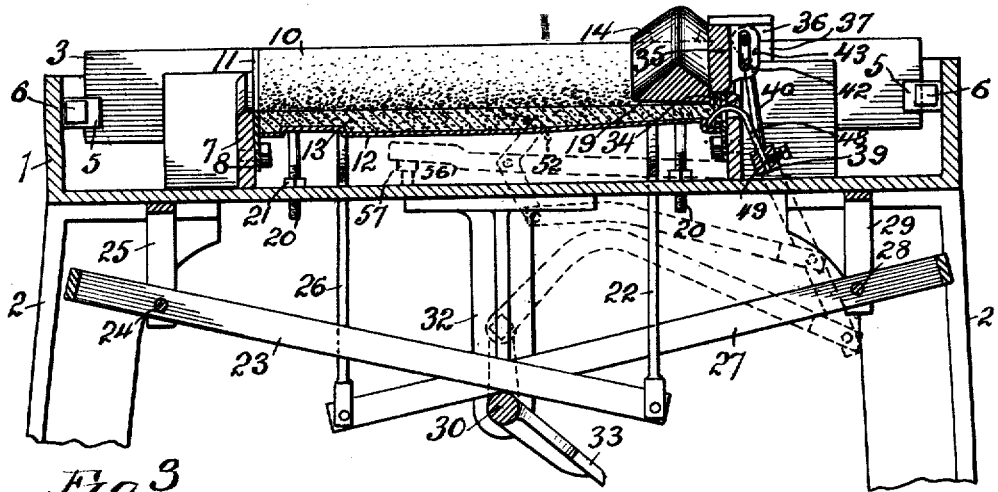
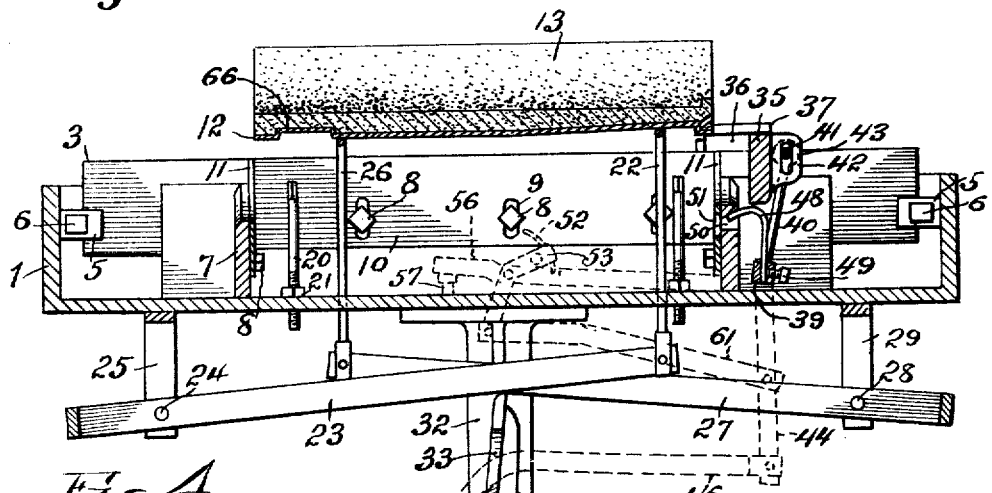
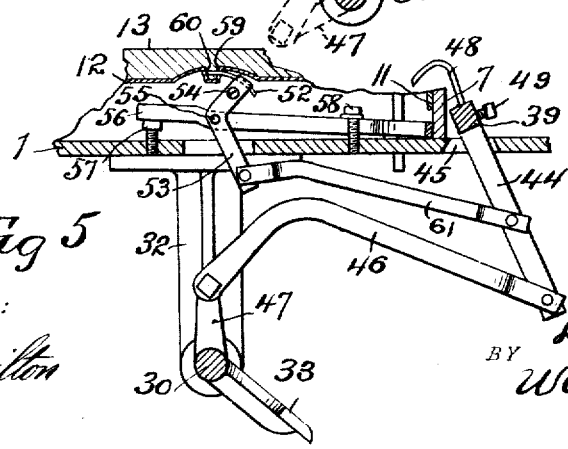
WITNESS:
R. C. Hamilton
INVENTOR.
Lars Hansen
BY Warren D. House
His ATTORNEY L. HANSEN.
MOLDING MACHINE.
APPLICATION FILED FEB. 18, 1918.
1,306,538.
Patented June 10, 1919.
3 SHEETS—SHEET 3.
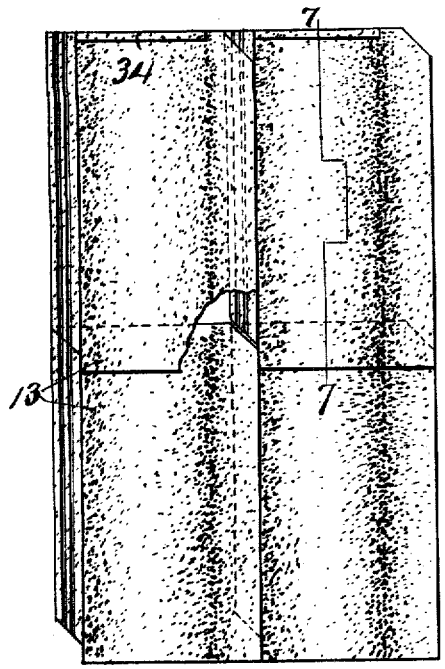
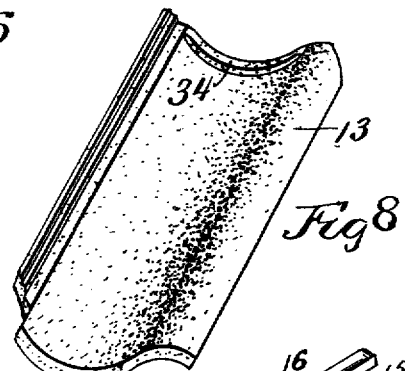
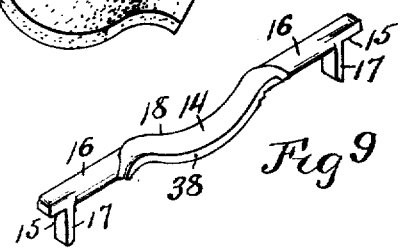
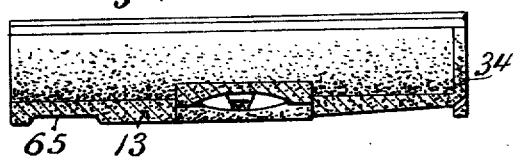
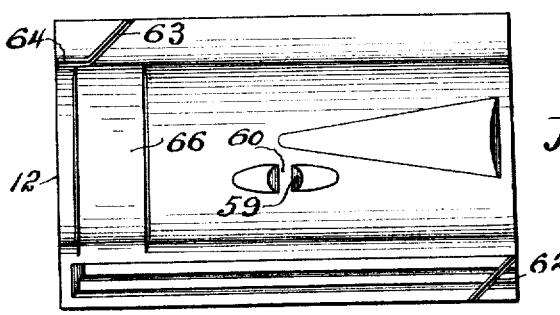
WITNESS:
R. E. Hamilton
INVENTOR.
Lars Hansen
BY Warren D. House
His ATTORNEY

UNITED STATES PATENT OFFICE.

LARS HANSEN, OF KANSAS CITY, MISSOURI.

MOLDING-MACHINE.

1,306,538.  Specification of Letters Patent.  Patented June 10, 1919.

Application filed February 18, 1918. Serial No. 217,746.

*To all whom it may concern:*

Be it known that I, LARS HANSEN, a citizen of the United States, residing at Kansas City, in the county of Jackson and State of Missouri, have invented a certain new and useful Improvement in Molding-Machines, of which the following is a specification.

My invention relates to improvements in molding machines.

It is particularly well adapted for making roofing tiles from cement or other plastic material.

One of the objects of my invention is to provide a molding machine with which tiles may be made which will nest together compactly for the purpose of storage or shipment.

A further object of my invention is to provide a novel molding machine for making tiles, the overlap of which may be varied without danger of leakage.

A further object of my invention is to provide a molding machine with novel means for forming holes in the molded tiles adapted to receive devices for securing the tiles to a roof.

Still another object of my invention is the provision of novel means for forming a transverse flange at one end of a tile.

Another object of my invention is the provision in a die plate of novel means for weakening the tile adjacent to diagonally related corners, so that the corners may be readily broken at the proper places from the finished tile.

Another object of my invention is the provision of novel means of readjustment of the mold members and other parts to compensate for wear.

Still another object of my invention is the provision of a novel forming tool to be used in connection with the mold members and die plate for forming the upper side of the tile, the under side of which is formed by the die plate.

My invention provides further a novel die plate, adapted to coöperate with a needle for forming holes in the tiles.

My invention provides still further vertically adjustable guides for supporting the forming tool.

Other novel features of my invention are hereinafter fully described and claimed.

In the accompanying drawings, which illustrate the preferred embodiment of my invention, Figure 1 is a plan view, partly broken away, and with the die plate and forming tool removed, of my improved molding machine.

Fig. 2 is a vertical sectional view, partly broken away, taken on the plane of the line 2—2 of Fig. 1, the die plate and forming tool with a tile therebetween being shown.

Fig. 3 is a vertical sectional view of the machine taken on the plane of the line 3—3 of Fig. 1, the die plate and forming tool being shown.

Fig. 4 is a view similar to Fig. 3, some of the parts being removed and the die plate being shown elevated.

Fig. 5 is a vertical sectional view on the plane of the line 5—5 of Fig. 1, the needle which passes through the bottom of the die plate being shown in operative relationship to the die plate, a portion of which is shown.

Fig. 6 is a plan view of four tiles, one of which is partly broken away, such as are molded with my improved machine, shown in their operative relationship to each other.

Fig. 7 is a sectional view on the line 7—7 of Fig. 6.

Fig. 8 is a perspective view of a completed tile with the two corners broken off.

Fig. 9 is a perspective view of the forming tool.

Fig. 10 is an end view of two of the tiles shown nested together.

Fig. 11 is a fragmental longitudinal sectional view of a tile showing the hole formed by the needle.

Fig. 12 is a top view of the die plate.

Similar reference characters designate similar parts in the different views.

I provide a suitable supporting frame comprising, preferably, a table having a box top 1 provided with legs 2. Two longitudinal guide plates 3, disposed edge up have their lower edges resting upon vertical screws 4 fitted in screw threaded holes in the bottom of the table top 1. The guide plates 3 are clamped, in such positions as they may be vertically adjusted by the screws 4, to the inner sides respectively of the box top 1 by clamping plates 5, which are secured to the box top 1 by bolts 6.

Upon the bottom of the box top 1 between the guide plates 3 and spaced apart therefrom is a mold frame 7 of rectangular form to the inner sides of which are respectively secured by bolts 8 extending through slots 9, vertically adjustable side mold members 10 and end mold members 11, the bolts 8 being fitted in screw threaded holes in the sides of the mold frame 7.

Between the mold members 10 and 11 is adapted to be mounted a die plate 12, the upper side of which forms the under side of the cement tile 13, the upper side of which is formed by a forming tool 14 having bearing surfaces 15 on its under side respectively adjacent to its ends, Figs. 2 and 9.

The under side of the central portion of the forming tool 14 is of the contour of and forms the upper side of the tile 13. The upper edges of the end mold members 11 are fitted to this central portion of the forming tool, so as to permit the tool to pass across them. The forming tool 14 between the central portion and the guide plates 3 is provided with hand holds 16 by means of which the operator manipulates the tool. Intermediate of the hand holds 16 and the bearing surfaces 15, the tool 14 is provided with downwardly extending projections 17 which respectively engage the inner sides of the guide plates 3 to limit the endwise movement of the tool, or to prevent any endwise movement, as may be desired.

The upper edges of the guide plates 3, and the bearing surfaces of the forming tool 14 are horizontal, while the under side 19 of the central portion 18 of the forming tool, is inclined upwardly and to the left, as shown in Fig. 3. The left or forward longitudinal side of the forming tool 14, as viewed in Fig. 3, is sharp and inclines upwardly and rearwardly, so that upon the tool being slid forwardly, that is to the left, as viewed in Fig. 3, the sharpened forward edge will cut away and force forwardly the excess cement and sand. As the under side 19 of the forming tool inclines downwardly and rearwardly, the tile material will be packed and smoothed thereby, and will not be rough, as would be the case if the bottom of the tool at its central portion were horizontal and parallel with the plane of movement of the tool.

For supporting the die plate 12 in the operative position, shown in Figs. 2, 3 and 5, there are provided between the mold members 10 and 11 and adjacent respectively to the corners of the mold frame 7, four vertical screws 20 which are respectively fitted in threaded holes in the bottom of the box top 1 of the table. Lock nuts 21 are respectively mounted on the screws 20 and are adapted to bear against the box top 1.

For lifting the die plate 12 above the mold members 10 and 11, as shown in Fig. 4, so that the plate with the molded tile thereon may be readily removed from the machine, there are provided two vertically slidable upright rods 22 which extend through and are slidable in holes provided in the table top 1, and which have inwardly turned upper ends adapted to engage and lift the adjacent end of the die plate 12. The lower ends of the rods 22 are respectively pivoted to the arms of a U shaped lever 23, the arms of which are respectively pivoted by horizontal bolts 24 to the arms of an inverted U shaped bracket 25, the transverse portion of which is secured to the under side of the table top 1.

The other end of the die plate 12 is adapted to be lifted by the transverse portion of an inverted U shaped member 26, the vertical arms of which extend through and are vertically slidable in holes in the table top 1. The lower ends of the arms of the member 26 are respectively pivoted to the arms of a U shaped lever 27, the arms of said lever being respectively pivoted by horizontal bolts 28 to the arms of an inverted U shaped bracket 29, the transverse portion of which is secured to the under side of the table top 1.

To swing the members or levers 27 and 23 so as to lift the member 26 and rods 22 and the die plate 12, there is provided a horizontal shaft 30 having a crank 31 and rotatably mounted in bearings 32 depending from and secured to the table top 1. The shaft 30 is provided with two cam arms 33 which are adapted, when the shaft is turned counter clockwise, as viewed in Figs. 3 and 4, to strike the under sides of the arms of the levers 23 and 27, thereby, on continued turning of the shaft 30 to the position shown in Fig. 4, lifting the die plate and formed tile 13 to the elevated position above the mold members 10 and 11.

For forming on the upper side of the tile 13 adjacent to one end thereof an arcuate transverse flange 34, there is provided a longitudinally slidable mold member 35, which has its ends slidably mounted respectively in two longitudinal grooves 36, which are respectively provided in the inner sides of two upright plates 37, which are respectively secured to opposite longitudinal sides of the mold frame 7. The mold member 35 is adapted to be moved from its outer position, shown in Fig. 4, over the adjacent end mold member 11 to the inner side thereof, as shown in Fig. 3. When the mold member 35 is in the position shown in Fig. 3, its lower edge is above and spaced apart from the die plate 12. It is also above the lower side of the forming tool 14. The latter is provided at its rear longitudinal side with a vertical portion 38 which extends above and below the lower edge of the mold member 35.

When the mold member 35 is in the operative position shown in Fig. 3, and the tile material has been deposited upon the die plate 12, and between the mold members 10 and 11, the operator, by properly sliding the forming tool 14 to the right, as viewed in Fig. 3, on the guides 3, will force the tile material against the adjacent end plate 11 and under the lower edge of the movable mold member 35, thereby forming the arcuate transverse flange 34 on the upper side and right end of the tile 13, as shown in Fig. 3, and as shown in Figs. 6 and 8. The lower edge of the mold member 35, preferably, has the same curve as the upper side and adjacent end of the die plate 12, so that the tiles will nest together, as shown in Fig. 10.

For moving the mold member 35 to and from the position shown in Fig. 3, there is provided a horizontal transverse rock shaft 39, having its ends pivoted respectively in opposite sides of the mold frame 7. The rock shaft 39 is provided with two radial arms 40, the upper ends of which are provided each with an eye through which extends a removable horizontal bolt 41, which also extends through and is vertically slidable in vertical slots 42 provided respectively in two rearwardly extending ears 43 which extend outwardly from the mold member 35. When the rock shaft 39 is oscillated, the arms 40 thereof will reciprocate the mold member 35. For swinging the rock shaft 39, it has extending radially and downwardly from it a crank arm 44, which extends through a slot 45 in the table top 1, and which has pivoted to it a link 46, which is pivoted at its other end to a crank 47, with which the crank shaft 30 is provided. The arrangement is such that when the crank shaft 30 is swung from the position shown in Fig. 3 to that shown in Fig. 4, the mold member 35 will first be moved so as to clear the inner side of the adjacent mold member 11, after which the cam arms 33 will swing the levers 27 and 23 so as to lift the die plate 12 to the elevated position shown in Fig. 4.

For forming a hole for a nail in the right end of the tile 13, as shown in Fig. 3, there is provided a needle 48, which is radially adjustable in a hole through the rock shaft 39, to which the needle is secured by a set screw 49. The other end of the needle 48 is curved and is adapted to pass through two holes 50 and 51 in the mold frame 7 and adjacent end mold member 11, as shown in Fig. 3. In the operative position, the needle will strike the upper side of the die plate 12. The portion of the needle which enters the mold has the form of a curve, the center of which is the axis of the rock shaft 39.

For forming a hole in the bottom of the tile 13, adjacent to the middle portion thereof, there is provided a curved needle 52, Fig. 5, which is clamped between two angular levers 53, secured together by a screw 54 and pivotally mounted on a horizontal bolt 55, which extends through and is fastened to two arms of a lever 56, one end of which rests upon the table top 1, and the other end of which rests upon a vertical screw 57, fitted in a screw-threaded hole in the table top 1, whereby the axis of the angular levers 53 may be vertically adjusted. A vertical screw 58 extends between the arms of the lever 56 and clamps the lever to the table top.

The needle 52 is adapted to enter a hole 59 provided in the die plate 12, which hole communicates with a depression 60 provided in the upper side of the die plate 12 for the reception of tile material. The end of the needle 52 is adapted to strike the wall of the depressed portion, as shown in Fig. 5. When the needle is in the position shown in Fig. 5, and the tile material is placed upon the die plate 12, it will fill the depression 60, around the needle 52. When the needle is withdrawn, it will leave a hole which extends through the lug on the under side of the tile formed by the depression 60. A link 61 has its ends pivoted respectively to the levers 53 and the crank arm 44.

The upper side of the die plate 12 is provided adjacent to one corner with an oblique rib 62, Fig. 12, which forms a groove in the under side of the tile 13, whereby the tile at this place is weakened so that the corner may be easily broken off, as is shown in Figs. 6 and 8.

The upper side of the die plate 12 adjacent to the corner diagonally related to the rib 62 is provided with a rib having an oblique portion 63, which at its inner end connects with a longitudinal portion 64, whereby the tile is weakened, so that the adjacent corner may be readily broken away.

The under side of the tile 13 has formed in it a recess 65, Fig. 7, which is formed by a transverse raised portion 66, on the upper side of the die plate 12. The groove 65 is much wider than the width of the arcuate flange 34, which is formed on the upper side of the tile 13 adjacent to the end distant from that provided with the recess 65.

When the tiles are fitted together as shown in Fig. 6, the flange 34 of the lower tile fits in the groove 65 of the tile next above. By having diagonal corners obliquely broken away, as shown, the overlap of the tiles may be varied a considerable amount to correspond with the distance between the strips to which the tiles are secured.

At the same time, the joints will be covered so that leakage will be avoided.

In the operation of my invention, the initial position of the parts, with the exception of the forming tool 14, will be as shown in Fig. 3. Sufficient tile making material is then placed upon the die plate 12, after which the forming tool 14 is employed to pack the material under the movable mold member 35 so as to form the flange 34 on the upper side of the tile 13. After this has been done, the forming tool 14 is moved away from the mold member 35, and being slid along on the guide plates 3, the sharpened forward edge of the forming tool 14 removes the excess material and pushes it forwardly, while the inclined under side of the forming tool 14 smooths and properly forms the upper surface of the tile.

The crank shaft 30 is then turned counter-clockwise by the crank handle 31, as viewed in Figs. 3 and 4, thereby swinging the needles 48 and 52 out of the formed tile, by means of the mechanism already described. At the same time, the mold member 35 will be moved to the outer side of the adjacent mold member 11. Continued turning in the same direction of the rock shaft 30 will cause engagement of the cam arms 33 with the levers 27 and 23, thereby swinging said levers so as to lift the die plate 12 to the position shown in Fig. 4, by means of the rods 22 and the member 26.

Upon retracting the crank shaft 30 to its initial position shown in Fig. 3, the levers 23 and 27 will swing downwardly by gravity, thus forcing downwardly the rods 22 and the member 26, to the position shown in Fig. 3. The new die plate 12 carried by said rods 22 and member 26 will be carried between the mold members 10 and 11 and will rest upon the screws 20. At the time the die plate 12 is brought to bear upon the screws 20, the mold member 35 and the needles 48 and 52 will move into their operative positions shown in Figs. 3 and 5.

By having the mold members 10 and 11 and the guide plates 3 and screws 20 vertically adjustable, compensation for wear due to the sliding back and forth of the forming tool 14 will be afforded.

By spacing the guide plates 3 at a considerable distance apart from the mold frame 7, the guide plates will be clear of cement and sand, thereby greatly reducing the wear upon them.

I do not limit my invention to the structure shown and described, as many modifications, within the scope of the appended claims, may be made without departing from the spirit of my invention.

What I claim is:—

1. In a molding machine, a supporting frame having guides, upright mold members supported by said frame, means adapted to support a die plate in operative position between said mold members, means adapted to engage and lift the die plate, a forming tool slidable on said guides over the die plate when the latter is in operative position, and means movable to and from an operative position for limiting the movement of said tool in one direction to a position in which it will be at the inner side of and spaced apart from said mold members.

2. In a molding machine, a supporting frame having guides, upright mold members supported by said frame, means adapted to support a die plate in operative position between said mold members, a forming tool slidable on said guides over the die plate when the latter is in operative position, and a mold member movable to and from a position over said die plate and at the inner side of one of said mold members.

3. In a molding machine, a supporting frame, upright mold members mounted thereon, means adapted to support a die plate in operative position between said mold members, a mold member movable to and from a position over said die plate and at the inner side of one of said mold members, and means for moving said movable mold member to and from said position and adapted to lift said die plate.

4. In a molding machine, a supporting frame, upright mold members mounted thereon, means adapted to support a die plate between said mold members, a mold member movable to and from an operative position over the die plate and at the inner side of one of said mold members, and means for first moving said movable mold member from its operative position and adapted after said movable mold member has been moved from the operative position to lift said die plate.

5. In a molding machine, a supporting frame, upright mold members mounted thereon, means adapted to support a die plate in operative position between said mold members, a mold member movable to and from an operative position over the die plate and at the inner side of one of said mold members, means for moving said movable mold member to and from its operative position and adapted to lift said die plate, and a forming tool slidable on said frame over said die plate toward and from said movable mold member.

6. In a molding machine, a supporting frame, an upright stationary mold member mounted thereon, means carried by the frame adapted to support a die plate in operative position, a movable mold member movable to and from an operative position over the die plate and at the inner side of said stationary mold member, a forming tool slidable on said frame over said die plate and to and from a position at the inner side of and adjacent to the movable mold member, when the latter is in the operative position, and means for moving said movable mold member from its operative position and adapted to subsequently lift said die plate.

7. In a molding machine, a supporting frame, a stationary mold member carried thereby, a mold member movable to and from a position at the inner side of said stationary mold member, and a forming tool movable on said frame toward and from said mold member and having its lower side disposed lower than said movable member.

8. In a molding machine, a supporting frame having guides, mold members disposed upright on said frame, means adapted to support a die plate in operative position between said mold members, and a forming tool slidable on said guides and having an under side from the forward to the rear side of the tool inclined to said guides.

9. In a molding machine, a supporting frame, a stationary mold member carried thereby, a mold member movable to and from an operative position at the inner side of said stationary mold member, and having its lower edge, when in the operative position, in horizontal alinement with the upper edge of the stationary mold member, and a forming tool movable horizontally on said frame to and from a position adjacent to and at the inner side of the movable mold member when the latter is in the operative position and having the longitudinal side which is adjacent to the movable mold member extending from and to a point below the lower edge of the movable mold member.

10. In a molding machine, a forming tool having a bearing surface, and having an under side from the forward to the rear side of the tool inclined to said bearing surface.

11. In a molding machine, a forming tool having a horizontal bearing surface and provided with one vertical longitudinal side, its other longitudinal side being downwardly and forwardly inclined, and having an under side from the forward to the rear side of the tool inclined to said bearing surface.

12. In a molding machine, a supporting frame, supporting means vertically adjustable thereon, a lever pivoted to said supporting means, and a hole forming needle carried by the lever and adapted to pass through a die plate.

13. In a molding machine, a supporting frame, supporting means vertically adjustable thereon, a lever pivoted to the supporting means, a die plate having in its upper side a depression and a hole therethrough at one side of said depression, and a hole forming needle carried by the lever and adapted to be carried thereby through said hole and across said depression.

In testimony whereof I have signed my name to this specification.

LARS HANSEN.

Copies of this patent may be obtained for five cents each, by addressing the "Commissioner of Patents, Washington, D. C."